Aug. 25, 1931.  E. WILDHABER  1,820,416
CUTTER HEAD FOR ROTARY GEAR CUTTING TOOLS
Filed March 24, 1927  2 Sheets-Sheet 1
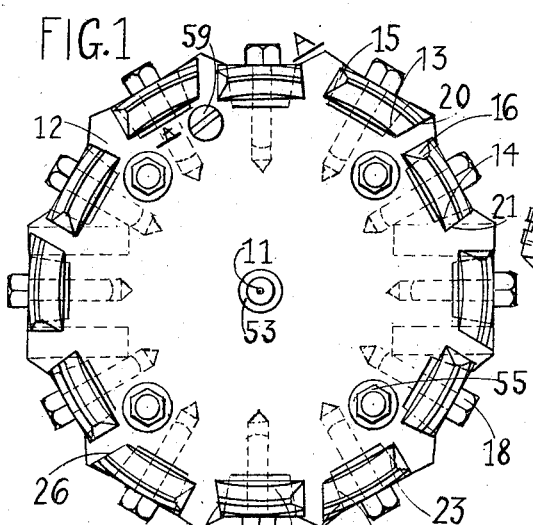
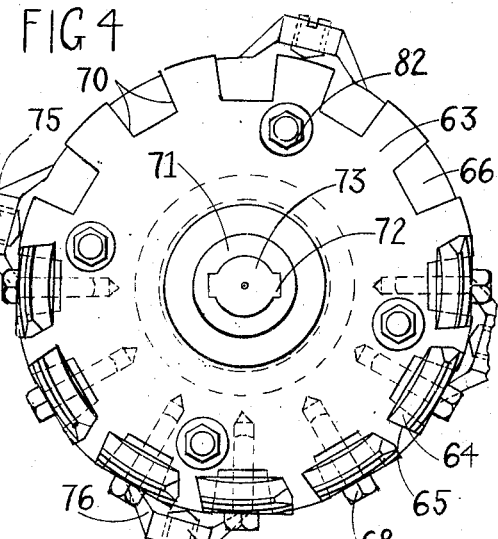
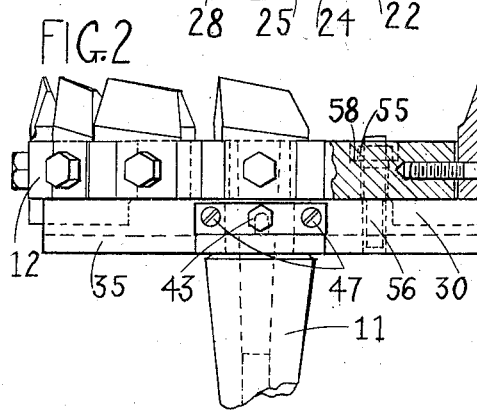
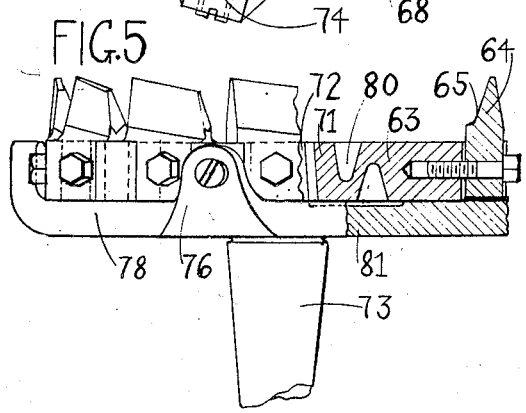
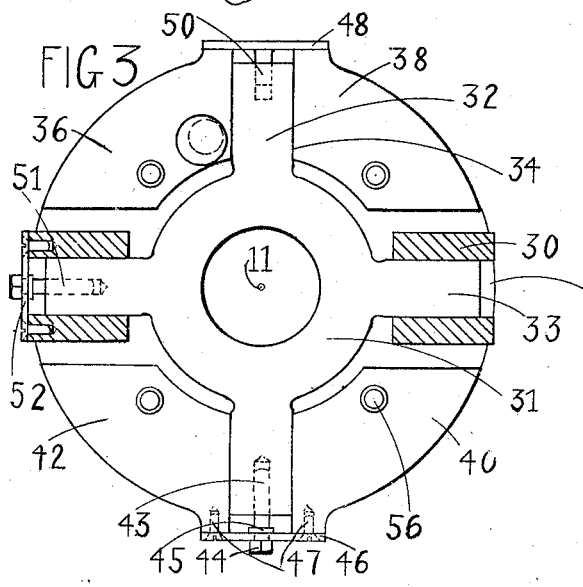
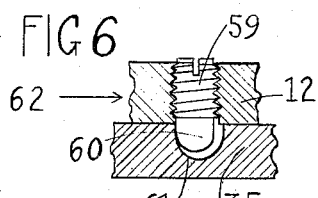
INVENTOR
Ernest Wildhaber Aug. 25, 1931.  E. WILDHABER  1,820,416
CUTTER HEAD FOR ROTARY GEAR CUTTING TOOLS
Filed March 24, 1927   2 Sheets-Sheet 2
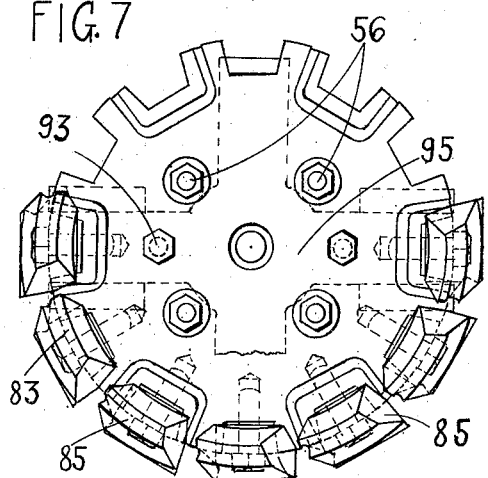
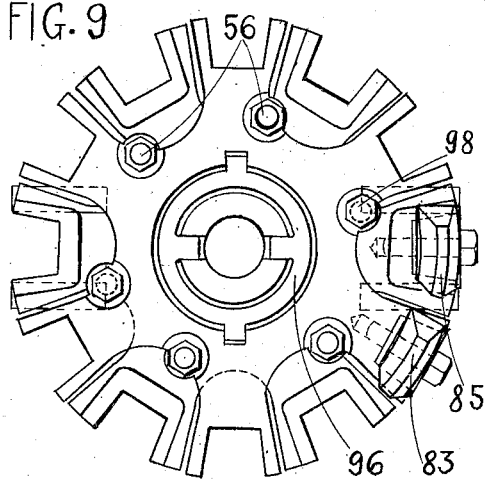
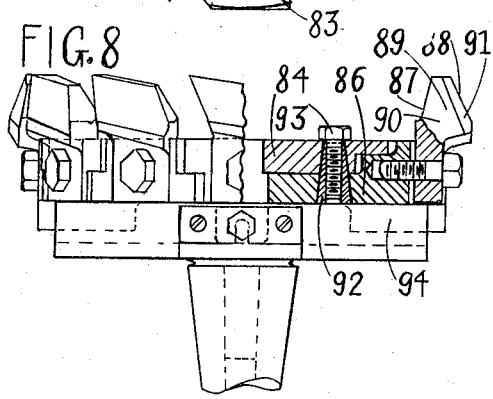
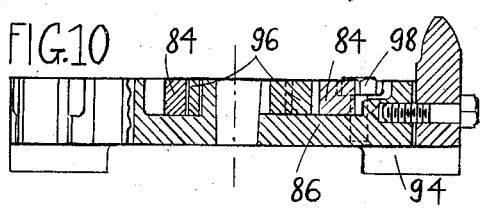
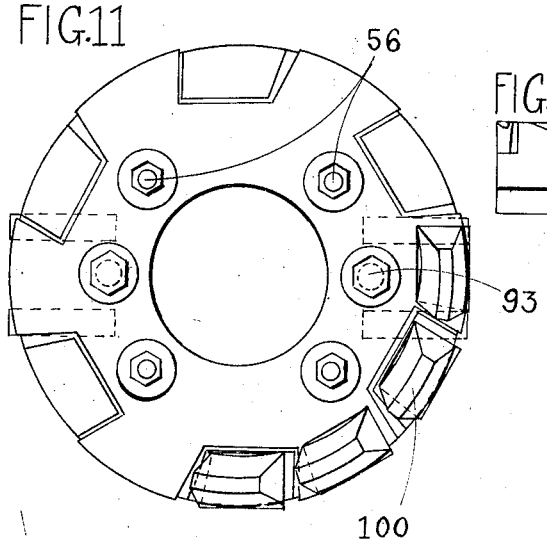
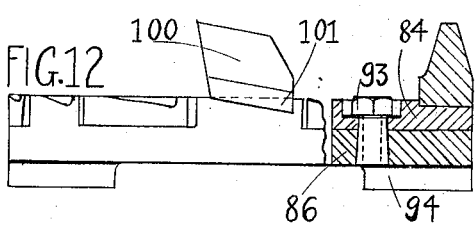
INVENTOR
Ernest Wildhaber Patented Aug. 25, 1931

1,820,416

UNITED STATES PATENT OFFICE

ERNEST WILDHABER, OF BROOKLYN, NEW YORK

CUTTER HEAD FOR ROTARY GEAR CUTTING TOOLS

Application filed March 24, 1927. Serial No. 177,992.

The present invention relates to cutter heads for rotary gear cutting tools, such as hobs and milling cutters. Among these, the type of cutter particularly referred to is the face mill, as used to a great extent especially for cutting spiral bevel gears and hypoid gears.

It is well known, that in order to obtain a smoothly finished tooth surface with a face mill, it is necessary to true up the different cutting edges or blades of the face mill, so that all corresponding cutting edges have exactly the same distance from the axis of rotation. Failure to do this will not only cause the various cutting edges to remove unequal amounts of stock and prevent some cutting edges from cutting at all, but it also causes flats, when a generating motion is provided between tool and blank, as known.

Hitherto face mills for cutting gears have been trued up by adjusting or truing up the cutting edges individually. Each blade, except a master blade, was adjusted in a radial slot, until its cutting edge ran exactly true with the cutting edge of said master blade. This process, practiced on every blade, generally consumed a long time, during which the gear cutting machine had to stand idle.

One object of the present invention is to devise a cutter head, which permits of an accurate truing operation in a fraction of the time previously required.

A further object is to devise a cutter head which permits of an accurate truing operation, and yet makes possible to hold the inserted blades absolutely rigidly, as if they were one piece with the cutter body.

A still other aim is to provide a cutter head containing an adjustable cutter of simpler and more rigid design than hitherto used.

Other objects will be apparent in the course of the specification and from reciting the appended claims.

My invention is illustrated by way of example in the accompanying drawings, in which Fig. 1 is a plan view of a cutter head constructed according to the present invention.

Fig. 2 is a front elevation, partly an axial section, of the cutter head shown in Fig. 1.

Fig. 3 is a plan view, partly a section of the cutter head shown in Fig. 1 and Fig. 2, with the top removed to show the structure underneath.

Fig. 4 and Fig. 5 are a plan view and a corresponding front elevation, the latter shown parly in section, of a modified cutter head constructed according to the present invention.

Fig. 6 is a partial section along A—A of Fig. 1, illustrative of a structural detail.

Fig. 7 is a plan view of a cutter head containing a composite type of face mill, such as preferably used when little space is left between adjacent cutting teeth or blades.

Fig. 8 is a front elevation and partly an axial section of the cutter head shown in Fig. 7.

Fig. 9 and Fig. 10 are a plan view and a corresponding front elevation, the latter partly an axial section, of another form of cutter head.

Fig. 11 and Fig. 12 are a plan view and a corresponding front elevation, the latter partly an axial section, of a cutter head according to the present invention and containing a composite face mill of different form.

The truing operation as hitherto practiced on face mills of the character described has for its purpose to adjust all the blades so that the cutting edges are concentric with the axis of rotation. Before adjustment the cutting edges may or may not lie in a surface of revolution. I have discovered, that it is possible to design a cutter, that even before adjustment corresponding cutting edges will lie in a surface of revolution of high accuracy, having an axis which is, if not coinciding, at least parallel to the axis of rotation. One reason that the cutting edges according to known practice do not always lie in surfaces of revolution, is the way of holding the blades. To keep the blades individually adjustable, the sides of the slots, in which the blades may be adjusted, are made parallel and with a running fit. The blades are therefore seldom held absolutely rigidly.

I preferably provide tapered slots, in which the blades are tightly pressed with screw bolts, before the blades are finish ground. In this manner the inserted blades may be so rigidly held, as if they were one piece with the cutter body.

The accuracy used in making a face mill gear cutter, and the accuracy used in re-sharpening it, that is in grinding the cutting faces, especially the accuracy of the index, is only of secondary importance in determining the location of the cutting edges with reference to a surface of revolution. If the relief provided back of the cutting edges would be zero, such inaccuracies would have no influence at all, and inasmuch as the relief actually provided is small as compared with the circumferential distances, the influence of inaccuracies in spacing and broadly from grinding and sharpening is small. No unreasonable accuracy in grinding the relieved sides of the blades or their cutting faces is required to keep the cutting edges in a surface of revolution.

Having made sure that the cutting edges, before truing, are already in a surface of revolution, means are now provided according to the present invention for so adjusting said surface of revolution that its axis coincides accurately with the axis of rotation.

With the present invention the adjustment of the individual blades can be replaced with two adjustments of the cutter body as a whole. This results not only in time being saved, but it also makes possible a simpler and more rigid cutting tool.

In the Figures 1-3, 11 denotes a cutter spindle, 12 the cutter body of a face mill provided on its periphery with slots 13, 14, to which blades 15, 16 are secured by means of screw bolts 18. The cutter illustrated is of a known type, in which each blade contains only one side cutting edge. The alternate blades 15 contain only an outside cutting edge 20, and the alternate blades 16 contain each an inside cutting edge 21 only. Adjacent blades, outside blade 15 and inside blade 16 may be at different distances from the center 11, and therefore slots 13 and 14 may be provided at different distances from center 11 also, as indicated.

It is noted that the slots 13, 14 are tapered, the sides 22, 23 being not parallel but at an angle to each other. This design permits to hold the blades on both sides 22, 23 with considerable pressure. They are therefore held absolutely rigidly.

The blades are preferably ground on the relieved sides 24, 25. If grinding is done in the same setup of the grinding machine it will not be difficult to keep the cutting edges 20, 21 in coaxial surfaces of revolution. The cutting edges are sharpened by grinding the cutting faces 26, 28 which extend along planes parallel to the axis 11 and offset therefrom, the offset being so chosen as to effect a keen outside cutting edge 20, or inside cutting edge 21 respectively.

In accordance with the present invention, the cutter body 12 is adjustable in two directions in a plane perpendicular to cutter spindle 11. It contains projections 30 which form guides for a floating member 31, in such manner that body 12 is adjustable relatively to the floating member in the direction of said guides. The shape of the floating member 31 is best shown in Fig. 3. Fig. 3 is a plan view similar to Fig. 1, but with cutter body 12 inclusive the blades taken off, in such manner that only its guides 30 remain, which are indicated in section in Fig. 3. The floating member contains projections 32 disposed at right angles to the projections 33, and has therefore the general appearance of a cross. Projections 32 fit into guides 34 projecting from a disk like member 35, which is solid with the cutter spindle 11. The parts 36, 38, 40, 42 forming guides 34 project from member 35 sufficiently to make contact with body 12.

Floating member 31 is suited to transmit torque from the spindle 11 to the cutter body 12, while permitting a slight adjustment in two directions of the cutter body with respect to the spindle, sufficient to accurately true up the cutter, whatever may be its initial eccentricity.

For adjusting floating member 31 and member 35 relatively to each other, a head screw 43 is provided, which engages a thread in member 31. The head 44 of said screw and a flange 45 secure screw 43 to a recess of a small plate 46 secured to member 35 with screws 47. Floating member 31 may thus be adjusted back and forth with screw 43. In gear cutting machines having a horizontal spindle 11, a plate 48 may be secured to the other end of member 35. A cylindrical projection 50 of plate 48 fits into a hole of floating member 31, permitting adjustment in the direction of said hole, which is also the direction of guides 34. Projection 50 and screw 43 prevent the floating member from falling out, when the cutter has been removed.

Adjustment between floating member 31 and cutter body 12 along guides 30 is effected by a head screw 51 which is held in axial direction by a plate 52 secured to cutter body 12.

The operation of the cutter head is as follows:

The cutter body is initially set by placing the tapered bore 53 concentric with a tapered bolt not shown, which fits the tapered bores. The four nuts 55 are then turned on the bolts 56, which are held in threaded holes of member 35, until the nuts come lightly into contact with their recessed seats 58 in the cutter body.

The cutter is then trued up by turning the cutter and locating eccentricity with an indicator in known manner, and by operating screws 43 and 51.

Before tightening the nuts 55, which press the cutter body against the member 35 of spindle 11, it is desirable to take out backlash between cutter body and member 35, that is to say to make sure that the torque is actually transmitted through the floating member 31, and not merely through the friction between the plane bottom of cutter body 12 and the contacting plane top of the member 35, pressed together with the screws 56. The floating member namely is suited to transmit any amount of torque, whereas the frictional contact is not suited to safely transmit large torques, inasmuch as a relative slip might occur during a heavy cut, and although small, disturb the accurately trued position.

Backlash may be taken out by simply turning screw 59, separately shown in Fig. 6, which extends in a threaded hole of cutter body 12, and which leans with its point 60 on one side of a recess 61 of member 35, in such manner as to press those surfaces of member 35, floating member 31, and body 12 together, through which the torque is transmitted during cutting. In Fig. 6 body 12 is pressed in the direction of arrow 62 as compared with member 35.

The Figures 4 and 5 illustrate a modified embodiment of the present invention. The cutter body 63 contains blades 64 projecting from it in the form of a face mill. The cutter illustrated possesses only one type of blades, namely blades having only inside cutting edges 65, as are used sometimes for cutting bevel pinions and hypoid pinions. The blades are again secured in tapered slots 66 by means of head screws 68, in such manner that they rest on the tapered sides 70 of said slots. The shape of the slots is particularly well visible in Fig. 4, where part of the blades are shown removed in the drawing. It is understood however that during cutting preferably all the blades are inserted.

The cutter body contains a hub 71, whose tapered bore is keyed to a tapered projection 72, which is one piece with the cutter spindle 73.

The row of blades of the cutter body can be trued up as a whole, that is to say its eccentricity can be changed by a small amount, by operating screws 74, 75, which fit into threaded holes of projections 76. The latter form part of a disk 78, which is also one piece with cutter spindle 73. With the screws 74, 75 the outside part of the cutter body, which contains the blades, may be pressed slightly to one side or to another, so as to make possible accurate truing up. To keep the possible amount of adjustment inside of ample limits, circular grooves 80, 81 may be provided on the cutter body, see Fig. 5, which permit mutiplied elastic deflection and increased adjustment.

After the cutter has been trued up, nuts 82 are tightened, which press the cutter body securely against the plane face of disk 78.

The Figures 7-12 illustrate embodiments of the present invention, as applied to face mills in which the clearance between adjacent teeth is comparatively small, so that it would be difficult to grind the relieved sides of the cutting teeth while all the blades are inserted.

The face mill is in such cases preferably composed of two parts, each part containing alternate blades. The blades of each part can then be easily ground while remaining inserted.

In the Figures 7 and 8, alternate blades 83 are secured to an upper part 84 of the composite cutter body, and alternate blades 85 are secured to the lower part 86. The blades illustrated are all equal, and possess each an inside cutting edge 87 and an outside cutting edge 88 formed by a composite cutting face 89. The latter contains part of a plane 90 adjacent inside cutting edge 87, and part of another plane 91 adjacent outside cutting edge 88, the two planes being connected by an intermediate surface. This said type of cutting face is more particularly described in my copending application entitled "Gear cutting tool," filed March 11, 1927, Serial No. 174,517.

The upper part 84, and the lower part 86 are accurately centered with respect to each other, or trued up, which may be done according to the present invention by adjusting a part as a whole; and are then rigidly connected. In Fig. 7 and Fig. 8 I have shown tapered bolts 92 for said connection, which fit into reamed holes of the two parts, and which may be held in place by head screws 93 engaging the internally threaded portion of said bolts 92. Part 86 of the cutter body contains projections 94 similar to the projections 30 of Fig. 2, and which form also guidances for a floating member 95.

The embodiment illustrated in Figs. 9 and 10 differs from the embodiment of Figs. 7 and 8 merely in the design for connecting the upper part 84 of the cutter body with the lower part 86. The torque is transmitted from the lower body to the upper body through a floating member 96, and in addition the two parts are pressed together with screws 98.

The embodiment shown in the Figures 11 and 12 differs from the embodiment of Figs. 7 and 8 in the manner of securing the blades to the cutter body. In the former case cutting teeth 100 are soldered or welded to the upper and lower parts 84, 86 respectively, and fit in shallow recesses 101 of said parts.

In the Figures 9-12 I have omitted the cutter spindle in the drawings, and its floating member. Both can be made exactly as in the Figures 1-3 or 7 and 8.

The invention is capable of various further embodiments and modifications without departing from its spirit. For the definition of its scope it is relied upon the appended claims.

What I claim is:

1. A cutter head for rotary gear cutting tools, comprising a plurality of cutting teeth, a portion joining said cutting teeth to form a unit, a spindle, means for adjusting said unit relatively to said spindle in at least two directions angularly disposed to each other and angularly disposed to the axis of said spindle, and means for transmitting torque from said spindle to said unit.

2. A cutter head for rotary gear cutting tools, comprising a plurality of equal cutting teeth, a portion joining said cutting teeth to form a unit, a spindle, means for adjusting said unit relatively to said spindle in at least two directions angularly disposed to each other and parallel to a plane perpendicular to the axis of said spindle, means for transmitting torque from said spindle to said unit, and means for holding said unit in adjusted position.

3. A cutter head for rotary gear cutting tools, comprising a spindle, a plurality of cutting teeth disposed equidistant from the axis of said spindle, a portion joining said cutting teeth to form a unit, means for adjusting said unit relatively to said spindle in a plane perpendicular to the axis of said spindle in two directions disposed at right angles to each other, and means for transmitting torque from said spindle to said unit.

4. A cutter head for rotary gear cutting tools, comprising a spindle, a plurality of cutting teeth arranged in the form of a face mill, a portion joining said cutting teeth to a unit, means for adjusting said unit in a plane perpendicular to the axis of said spindle in two directions disposed at right angles to each other, means for transmitting torque from said spindle to said unit, and means for holding said unit in adjusted position relatively to said spindle.

5. Cutter head for rotary gear cutting tools, comprising a tool having a plurality of cutting teeth, a cutter spindle, a floating member adjustable in a straight line with respect to said cutter spindle and in another straight line with respect to said tool, said straight lines being situated in a plane perpendicular to the cutter spindle and being at a right angle to each other, and means for rigidly connecting tool and spindle.

6. A cutter head for rotary gear cutting tools, comprising a tool having a plurality of cutting teeth equidistant from its axis, a cutter spindle, means for adjusting said tool relatively to said spindle in two directions, a floating member for transmitting torque from said spindle to said tool in all positions of adjustment, and means for directly connecting said tool and said spindle.

7. A cutter head for rotary gear cutting tools, comprising a face mill having a plurality of equal cutting teeth, a cutter spindle, a floating member, means for adjusting said floating member and said face mill relatively to each other along a straight line, means for adjusting said floating member and said spindle relatively to each other along another straight line angularly disposed to the first named straight line, and means for directly connecting said face mill and said spindle.

8. A cutter head for rotary gear cutting tools, comprising a face mill having a plurality of equal cutting teeth, a cutter spindle, screws for adjusting said face mill relatively to said spindle in at least two directions angularly disposed to each other, a floating member for transmitting torque from said spindle to said face mill in all positions of adjustment, and means for directly connecting said face mill and said spindle.

9. Cutter head for rotary gear cutting tools, comprising a face mill having a plurality of inserted cutting teeth, a cutter spindle, a floating member, means for adjusting the face mill with respect to said floating member, means for adjusting the floating member with respect to said spindle in a direction perpendicular to the first said adjustment, and means for bolting the face mill to said spindle.

10. In a cutter head for rotary gear cutting tools, a plurality of cutting blades projecting from a cutter body to form a face mill, said blades being secured to tapered slots in such manner as to rest on the tapered sides of said slots, a spindle, and means for adjusting said cutter body relatively to said spindle in at least two directions parallel to a plane perpendicular to the axis of said spindle.

11. In a cutter head for rotary gear cutting tools, a plurality of cutting teeth arranged to form a face mill and forming part of two members, alternate teeth belonging to the same member, means for rigidly connecting said two members, a spindle, means for jointly adjusting said two members in a plane perpendicular to said spindle, and means for rigidly connecting said members and said spindle.

12. In a cutter head for rotary gear cutting tools, a plurality of blades arranged to form a face mill and secured to two members, alternate blades being secured to the same member, means for rigidly connecting said two members, a spindle, means for jointly adjusting said two members in a plane perpendicular to said spindle, and means for rigidly connecting said members and said spindle.

13. A cutter head for rotary gear cutting tools, comprising a cutter body, cutting teeth projecting from said cutter body, a spindle, a portion integral with said spindle contacting with said cutter body, means for adjusting said cutting teeth as a whole in a direction at an angle to the axis of said spindle, and means for rigidly connecting said cutter body and said spindle.

14. A cutter head for rotary gear cutting tools, comprising a cutter body, cutting teeth projecting from said cutter body, a spindle, means for adjusting said cutting teeth as a whole in a plane perpendicular to said spindle, means for transmitting torque from said spindle to said cutter body, and screws for directly connecting said cutter body with a portion integral with said spindle.

15. A cutter head for rotary gear cutting tools, comprising a cutter body, cutting teeth projecting from said cutter body, a spindle, screws for adjusting said cutting teeth as a whole in two different directions perpendicular to the axis of said spindle, means for transmitting torque from said spindle to said cutter body, and other means for rigidly and directly securing said cutter body to said spindle.

16. A cutter head for rotary gear cutting tools, comprising two members each of which having cutting teeth arranged to form a face mill, a cutter spindle, means for adjusting said two members relatively to said spindle in at least two directions angularly disposed to each o her and parallel to a plane perpendicular to the axis of said spindle, and means for transmitting torque from said spindle to said members.

17. Cutter head for rotary gear cutting tools, comprising a plurality of cutting teeth arranged to form a face mill and belonging to two members rigidly secured together, a cutter spindle, a floating member suitable to transmit torque from the cutter spindle to said two members, means for adjusting said two members in two directions in a plane perpendicular to the cutter spindle, and means for rigidly connecting the spindle with the two members.

18. Cutter head for rotary gear cutting tools, comprising a plurality of cutting blades arranged to form a face mill and secured to two members, rigidly bolted together, a cutter spindle, a floating member, means for adjusting sa:d two members wi h respect to said floating member, means for adjusting the floating member with respect to the cutter spindle, and means for rigidly connecting the spindle with the two members.

19. Cutter head for rotary gear cutting tools, comprising a cutter spindle, a face mill adjustable in two directions with respect to said cutter spindle, means for centering said face mill before truing, and means for rigidly securing the face mill to said cutter spindle.

20. Cutter head for rotary gear cutting tools, comprising a cutter spindle, a face mill adjustable in two directions with respect to said cutter spindle, means for taking out backlash between face mill and cutter spindle, and means for rigidly securing the face mill to said cutter spindle.

21. A cutter head for rotary gear cutting tools, comprising a plurality of cutting teeth arranged in a circle, a disk joining said cutting teeth to form a unit, a hole provided in the center of said disk, at least one groove provided in said disk and extending around said hole so as to separate the inner portion of said disk adjacent said hole from the outer portion containing said cutting teeth, and means for displacing said outer portion with respect to said inner portion in at least two directions, for centering said cutting teeth.

ERNEST WILDHABER.